United States Patent
Akamatsu et al.

(10) Patent No.: US 11,498,617 B2
(45) Date of Patent: Nov. 15, 2022

(54) VEHICLE CONTROL METHOD AND VEHICLE CONTROL DEVICE

(71) Applicant: Nissan Motor Co., Ltd., Yokohama (JP)

(72) Inventors: Yuta Akamatsu, Kanagawa (JP); Masahiro Kobayashi, Kanagawa (JP); Yasuhisa Taira, Kanagawa (JP); Osamu Fukata, Kanagawa (JP); Ko Sato, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/498,239

(22) Filed: Oct. 11, 2021

(65) Prior Publication Data

US 2022/0024515 A1 Jan. 27, 2022

Related U.S. Application Data

(63) Continuation of application No. 16/605,060, filed as application No. PCT/JP2017/015392 on Apr. 14, 2017, now Pat. No. 11,148,711.

(51) Int. Cl.
*B62D 6/04* (2006.01)
*B60W 60/00* (2020.01)
(Continued)

(52) U.S. Cl.
CPC ............... *B62D 6/04* (2013.01); *B60W 30/09* (2013.01); *B60W 30/10* (2013.01); *B60W 30/12* (2013.01);
(Continued)

(58) Field of Classification Search
None
See application file for complete search history.

(56) References Cited

U.S. PATENT DOCUMENTS 5,710,565 A * 1/1998 Shirai ..................... G05D 1/024
342/72
6,185,492 B1 * 2/2001 Kagawa ............... B62D 15/025
701/28
(Continued)

FOREIGN PATENT DOCUMENTS

CA 3059863 A1 * 10/2018 ............ B60W 10/20
CN 103809593 A * 5/2014 ......... B62D 15/0255
(Continued)

*Primary Examiner* — Kevin R Steckbauer
(74) *Attorney, Agent, or Firm* — Young Basile Hanlon & MacFarlane, P.C.

(57) ABSTRACT

A vehicle control method for controlling a vehicle using a vehicle control apparatus includes: a sensor configured to detect a state outside a subject vehicle; and a control device. The vehicle control method includes: executing control of recovering a travel trajectory of the subject vehicle to a target trajectory, as ordinary control, by giving a steering amount in a lateral direction with respect to a travel lane of the subject vehicle; using detection data of the sensor to determine whether or not another vehicle is traveling in an adjacent lane to the travel lane of the subject vehicle; and when determining that the other vehicle is traveling in the adjacent lane ahead of the subject vehicle, increasing a response of the steering amount to a higher response than that in the ordinary control, before the subject vehicle passes the other vehicle.

5 Claims, 8 Drawing Sheets

(51) Int. Cl.
*B62D 5/04* (2006.01)
*B60W 30/12* (2020.01)
*B60W 30/10* (2006.01)
*B60W 30/18* (2012.01)
*B60W 30/09* (2012.01)
*B62D 15/02* (2006.01)
*B60W 50/08* (2020.01)
*B60W 10/20* (2006.01)

(52) U.S. Cl.
CPC .... *B60W 30/18163* (2013.01); *B60W 60/001* (2020.02); *B60W 60/0027* (2020.02); *B62D 5/046* (2013.01); *B60W 10/20* (2013.01); *B60W 50/087* (2013.01); *B60W 2420/00* (2013.01); *B60W 2510/202* (2013.01); *B60W 2554/402* (2020.02); *B60W 2554/4023* (2020.02); *B60W 2554/4049* (2020.02); *B60W 2554/80* (2020.02); *B60W 2710/202* (2013.01); *B62D 15/025* (2013.01); *B62D 15/026* (2013.01); *B62D 15/0265* (2013.01)

(56) References Cited

U.S. PATENT DOCUMENTS

| | | | | |
|---|---|---|---|---|
| 6,311,119 | B2* | 10/2001 | Sawamoto | B60W 30/16 701/96 |
| 6,353,788 | B1* | 3/2002 | Baker | B60K 31/0008 340/436 |
| 7,765,066 | B2* | 7/2010 | Braeuchle | B60W 50/0097 701/41 |
| 8,170,788 | B2* | 5/2012 | Sjogren | B62D 15/025 701/41 |
| 8,224,550 | B2* | 7/2012 | Kudo | B62D 15/025 180/443 |
| 8,521,363 | B2* | 8/2013 | Kataoka | B60W 30/12 701/41 |
| 8,682,500 | B2* | 3/2014 | Sakugawa | B62D 15/025 701/1 |
| 8,717,156 | B2* | 5/2014 | Tronnier | G08G 1/166 340/425.5 |
| 8,718,919 | B2* | 5/2014 | Leineweber | G08G 1/163 340/913 |
| 8,838,337 | B2* | 9/2014 | Ueda | G05D 1/0088 382/104 |
| 8,996,294 | B2* | 3/2015 | Kurata | B60K 31/0008 701/96 |
| 9,051,008 | B2* | 6/2015 | Schiehlen | B62D 15/029 |
| 9,120,486 | B1* | 9/2015 | Mallinger | B60W 30/12 |
| 9,227,659 | B2* | 1/2016 | Ahmed | B62D 15/025 |
| 9,327,764 | B2* | 5/2016 | Limpibunterng | B62D 1/286 |
| 9,415,776 | B2* | 8/2016 | Schwindt | B60W 30/09 |
| 9,604,609 | B2* | 3/2017 | Elwart | B60T 8/1755 |
| 9,764,735 | B2* | 9/2017 | Silvlin | B62D 15/0265 |
| 9,896,093 | B2* | 2/2018 | Vollmer | B60W 10/20 |
| 9,988,047 | B2* | 6/2018 | Johnson | G08G 1/166 |
| 10,118,612 | B2* | 11/2018 | Westover | B60W 30/18163 |
| 10,150,474 | B2* | 12/2018 | Sterniak | G05D 1/021 |
| 10,220,873 | B2* | 3/2019 | Radabaugh | B60W 50/082 |
| 10,421,491 | B2* | 9/2019 | Shimizu | G08G 1/166 |
| 10,435,071 | B2* | 10/2019 | Nakada | B62D 5/0463 |
| 10,600,324 | B2* | 3/2020 | Fujii | B60W 50/14 |
| 10,688,993 | B2* | 6/2020 | Johnson | B60W 30/12 |
| 10,864,915 | B2* | 12/2020 | Fujiki | B60W 10/20 |
| 10,875,575 | B2* | 12/2020 | Kunihiro | G01L 5/221 |
| 11,077,854 | B2* | 8/2021 | Um | B60W 30/18163 |
| 11,148,711 | B2* | 10/2021 | Akamatsu | B60W 60/0027 |
| 11,173,912 | B2* | 11/2021 | Yoo | B60W 30/181 |
| 2001/0014846 | A1* | 8/2001 | Sawamoto | B60W 30/16 701/96 |
| 2005/0228588 | A1* | 10/2005 | Braeuchle | B62D 15/025 701/301 |
| 2007/0198188 | A1* | 8/2007 | Leineweber | B60W 30/16 701/117 |
| 2007/0225914 | A1* | 9/2007 | Kawazoe | B62D 15/025 340/436 |
| 2008/0033614 | A1* | 2/2008 | Schiehlen | B62D 15/0265 701/41 |
| 2009/0157247 | A1* | 6/2009 | Sjogren | B62D 1/28 701/23 |
| 2009/0164080 | A1* | 6/2009 | Kurata | B60W 50/16 701/70 |
| 2009/0171533 | A1* | 7/2009 | Kataoka | B62D 15/025 701/41 |
| 2009/0216405 | A1* | 8/2009 | Kudo | B62D 15/025 701/41 |
| 2011/0040468 | A1* | 2/2011 | Leineweber | G08G 1/165 701/96 |
| 2011/0137488 | A1* | 6/2011 | Sakugawa | B62D 15/025 701/1 |
| 2012/0154135 | A1* | 6/2012 | Tronnier | G08G 1/166 340/435 |
| 2012/0197496 | A1* | 8/2012 | Limpibunterng | B62D 1/286 701/42 |
| 2014/0129084 | A1* | 5/2014 | Lee | B62D 15/0255 701/41 |
| 2015/0025745 | A1* | 1/2015 | Tamura | B62D 5/046 701/41 |
| 2015/0142207 | A1* | 5/2015 | Flehmig | B60W 30/18163 701/1 |
| 2015/0166062 | A1* | 6/2015 | Johnson | B60W 10/20 701/41 |
| 2015/0203151 | A1* | 7/2015 | Ahmed | B60W 30/12 701/41 |
| 2015/0321668 | A1* | 11/2015 | Elwart | B60T 8/17557 701/41 |
| 2015/0344029 | A1* | 12/2015 | Silvlin | B62D 15/025 701/36 |
| 2017/0072949 | A1* | 3/2017 | Vollmer | B60W 10/20 |
| 2017/0101096 | A1* | 4/2017 | Kim | B60W 30/18163 |
| 2017/0240205 | A1* | 8/2017 | Nakada | B62D 15/025 |
| 2017/0253182 | A1* | 9/2017 | Aoki | G01C 21/265 |
| 2018/0056996 | A1* | 3/2018 | Lee | B60W 10/20 |
| 2018/0141588 | A1* | 5/2018 | Shimizu | B62D 15/0265 |
| 2018/0186371 | A1* | 7/2018 | Sterniak | B62D 15/0255 |
| 2018/0251124 | A1* | 9/2018 | Westover | B60W 30/188 |
| 2018/0273033 | A1* | 9/2018 | Johnson | G08G 1/165 |
| 2018/0339693 | A1* | 11/2018 | Kunihiro | F02D 17/04 |
| 2019/0023304 | A1* | 1/2019 | Radabaugh | B62D 1/286 |
| 2019/0071099 | A1* | 3/2019 | Nishiguchi | B62D 15/0255 |
| 2019/0071125 | A1* | 3/2019 | Kunihiro | G01L 5/221 |
| 2019/0106149 | A1* | 4/2019 | Kunihiro | B62D 6/04 |
| 2019/0248414 | A1* | 8/2019 | Ohtani | B62D 6/001 |
| 2019/0291726 | A1* | 9/2019 | Shalev-Shwartz | B60W 30/18154 |
| 2019/0299984 | A1* | 10/2019 | Shalev-Shwartz | B60W 50/0097 |
| 2019/0337509 | A1* | 11/2019 | Shalev-Shwartz | B60W 50/087 |
| 2020/0079378 | A1* | 3/2020 | Ochida | G06V 20/56 |
| 2020/0086866 | A1* | 3/2020 | Miura | G05D 1/0088 |
| 2020/0156634 | A1* | 5/2020 | Jeong | G08G 1/167 |
| 2020/0160069 | A1* | 5/2020 | Sathyanarayana | G06T 7/11 |
| 2020/0164882 | A1* | 5/2020 | Beiderbeck | G08G 1/167 |
| 2020/0231159 | A1* | 7/2020 | Tsuji | G08G 1/167 |
| 2020/0307623 | A1* | 10/2020 | Akamatsu | B60W 30/09 |
| 2020/0391793 | A1* | 12/2020 | Loussaut | G01L 5/221 |
| 2021/0094577 | A1* | 4/2021 | Shalev-Shwartz | B60W 30/0953 |
| 2021/0150905 | A1* | 5/2021 | Yamamoto | B62D 15/025 |
| 2021/0240197 | A1* | 8/2021 | Shalev-Shwartz | B60W 60/0016 |
| 2021/0309291 | A1* | 10/2021 | Kobayashi | B62D 5/006 |
| 2022/0024515 | A1* | 1/2022 | Akamatsu | B60W 30/18163 |
| 2022/0055685 | A1* | 2/2022 | Kim | B60W 50/14 |

FOREIGN PATENT DOCUMENTS

| | | | | |
|---|---|---|---|---|
| CN | 103809593 B | * | 2/2018 | ......... B62D 15/0255 |
| CN | 109649477 A | * | 4/2019 | ............ B60W 10/20 |
| CN | 110114254 A | * | 8/2019 | ............ B60W 30/02 |

(56) References Cited

FOREIGN PATENT DOCUMENTS

| | | | | |
|---|---|---|---|---|
| CN | 110536828 | A * | 12/2019 | ............ B60W 10/20 |
| DE | 102011088164 | A1 * | 6/2013 | ............ B60T 8/1755 |
| EP | 2727794 | A1 * | 5/2014 | ......... B62D 15/0255 |
| EP | 3566220 | A1 * | 11/2019 | ............ B60W 30/02 |
| EP | 3611077 | A1 * | 2/2020 | ............ B60W 10/20 |
| EP | 3611077 | A4 * | 4/2020 | ............ B60W 10/20 |
| JP | 2001001927 | A * | 1/2001 | ......... B62D 15/0255 |
| JP | 2001001927 | A | 1/2001 | |
| JP | 2005524135 | A | 8/2005 | |
| JP | 5514333 | B2 * | 6/2014 | ......... B62D 15/0255 |
| JP | 2015037932 | A | 2/2015 | |
| JP | 2015189404 | A | 11/2015 | |
| JP | 2018020631 | A * | 2/2018 | ......... B62D 15/0255 |
| JP | 2019069745 | A * | 5/2019 | ............ B60W 10/20 |
| WO | WO-2018025788 | A1 * | 2/2018 | ......... B62D 15/0255 |
| WO | WO-2018127430 | A1 * | 7/2018 | ............ B60W 30/02 |
| WO | WO-2018189912 | A1 * | 10/2018 | ............ B60W 10/20 |

* cited by examiner

VEHICLE CONTROL METHOD AND VEHICLE CONTROL DEVICE

CROSS-REFERENCE TO RELATED APPLICATION(S)

This application is a continuation application of U.S. patent application Ser. No. 16/605,060, filed Oct. 14, 2019, which is a 371 national stage of International Patent Application Serial No. PCT/JP2017/015392, filed Apr. 14, 2017, the entire disclosures of which are hereby incorporated by reference.

TECHNICAL FIELD

The present invention relates to a vehicle control method and a vehicle control apparatus.

BACKGROUND

A vehicular steering device having an electric motor for steering is known (see JP2015-37932A, for example). When the vehicle is in a state of traveling straight ahead, the driving power relating to the electric motor is controlled on the basis of vehicle information including the steering torque and steering angle, and assist torque is thereby given to the steering system. The vehicular steering device as disclosed in JP2015-37932A operates to calculate an integration value of torque determined by integrating the steering torque and, when the integration value of torque is not less than a threshold, perform steering-pull reduction control for the driving power relating to the electric motor so as to cancel a steering-pull phenomenon of the vehicle.

SUMMARY

However, there is a problem in that it takes time until the steering-pull reduction control is started after the vehicle causes the steering pull because the steering-pull reduction control is started when the vehicle causes the steering pull and the integration value of steering torque becomes the threshold or more.

A problem to be solved by the present invention is to provide a vehicle control method or a vehicle control apparatus with which control of suppressing a phenomenon that the subject vehicle is attracted to another vehicle when passing the other vehicle can be executed in a shorter time as compared with the case of executing the steering-pull reduction control at the time point when the integration value of steering torque becomes a threshold or more as in the prior art.

The present invention solves the above problem through: executing control of recovering a travel trajectory of the subject vehicle to a target trajectory, as ordinary control, by giving a steering amount in a lateral direction with respect to a travel lane of the subject vehicle; using detection data of a sensor to determine whether or not another vehicle is traveling in an adjacent lane to the travel lane of the subject vehicle; and when determining that the other vehicle is traveling in the adjacent lane ahead of the subject vehicle, increasing a response of the steering amount to a higher response than that in the ordinary control, before the subject vehicle passes the other vehicle.

According to the present invention, an effect can be obtained in which the attraction suppression control can be executed in a short time.

DETAILED DESCRIPTION

Hereinafter, one or more embodiments of the present invention will be described with reference to the drawings. In the embodiments, an exemplary case will be described in which the vehicle control apparatus according to the present invention is applied to a vehicle control system for vehicles.

Figure 1:
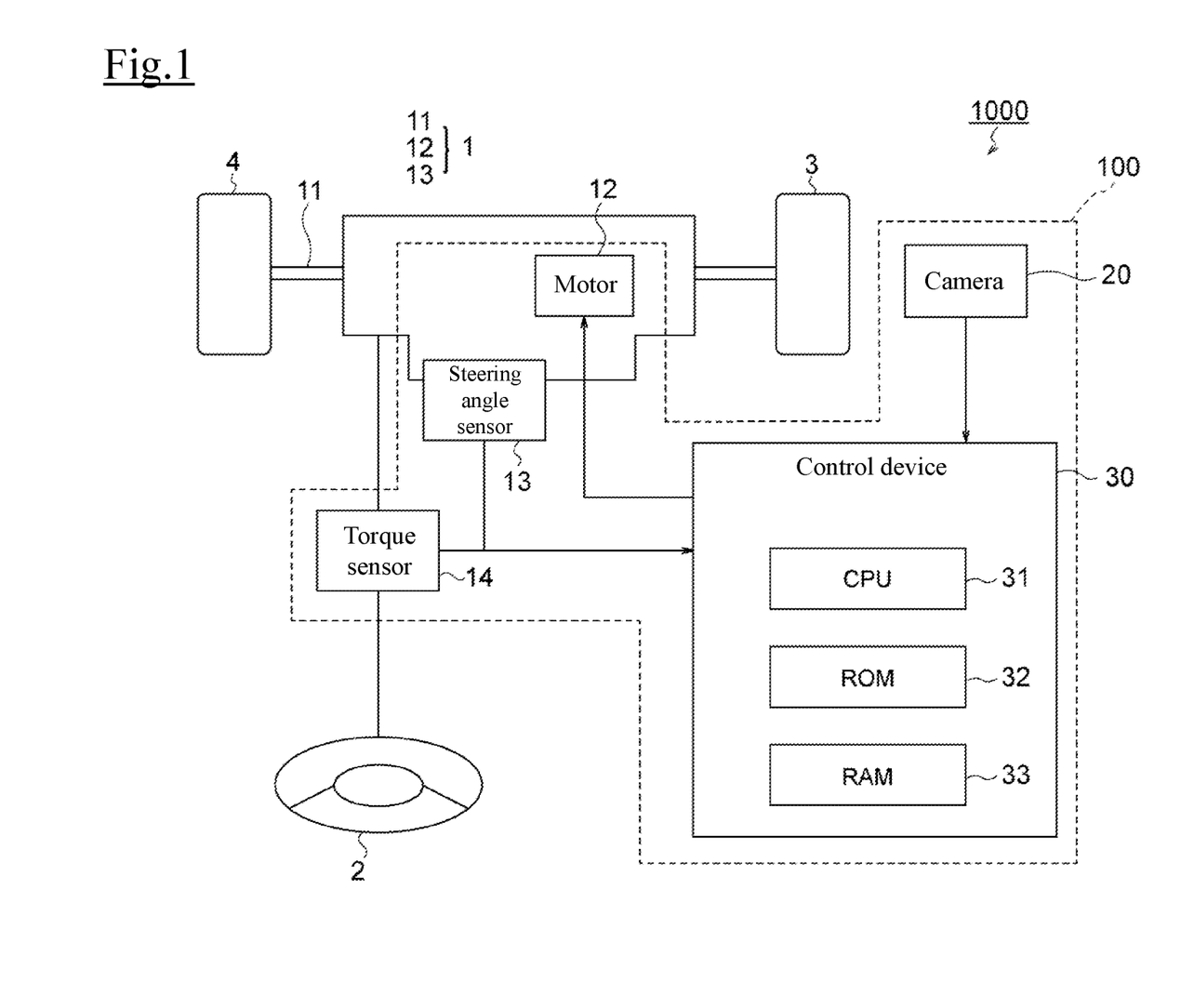
FIG. 1 is a block diagram of a vehicle control system 1000 having a vehicle control apparatus according to one or more embodiments of the present invention.

FIG. 1 is a block diagram of a vehicle control system 1000 having a vehicle control apparatus 100 according to one or more embodiments of the present invention. The vehicle control system 1000 according to one or more embodiments of the present invention includes a steering unit 1, a steering wheel 2, wheels 3 and 4, and the vehicle control apparatus 100. The vehicle control apparatus 100 according to one or more embodiments of the present invention controls steering of the wheels 3 and 4 in response to the operation of the steering wheel 2.

The steering unit 1 has a shaft 11, a motor 12, a steering angle sensor 13, a torque sensor 14, and a gear (not illustrated). The shaft 11 is connected to the right and left drive wheels. A rack-and-pinion-type steering gear is used for the gear, and the front wheels 3 and 4 are steered in accordance with the rotation of the shaft 11.

The motor 12 is, for example, a brushless motor, and the output shaft of the motor 12 is connected to the rack gear via a reduction gear and outputs the steering torque for steering the front wheels 3 and 4 to the rack in response to a control command from a control device 30. The motor 12 also operates to give a steering amount in response to the control command from the control device 30 and outputs the steering torque. The steering amount is given to the steering unit 1 in order to promote steering for disturbance suppression. For example, when a disturbance such as a crosswind is input and affects the behavior of the vehicle, the steering torque for the disturbance suppression is given to the steering thereby to suppress the steering operation in the direction in which the crosswind blows. Such steering-pull control for the vehicle due to disturbance is employed, for example, in a lane departure prevention assistance system and other similar systems. When the steering mechanism of the steering unit 1 can be electronically controlled, the motor 3 may be installed so as to generate a steering amount directly to the steering mechanism. When the steering unit 1 is configured for electrohydraulic power steering, the motor 3 supplies the power to an electric pump. The motor 12 corresponds to the "actuator" of the present invention.

The steering angle sensor 13 detects the rotation angle of the motor 12 to calculate the steering angle of the front wheels 3 and 4. There is a correlation between the rotation angle of the motor 12 and the steering angle of the front wheels 3 and 4. The steering angle sensor 13 calculates the steering angle corresponding to the motor rotation angle while referring to a map that represents the correspondence relationship between the rotation angle of the motor 12 and the steering angle of the front wheels 3 and 4, and thereby detects the steering angle of the front wheels 3 and 4.

The torque sensor 14, which is provided in a connection mechanism that connects the steering wheel 2 and the steering unit 1, detects the steering torque corresponding to the steering amount of the steering wheel 2 operated by the driver. The steering angle sensor 13 and the torque sensor 14 output the detected values to the control device 30.

A camera 20 is provided as an imaging device that images a state ahead of the vehicle. The camera 20, which operates while the vehicle is traveling, is used as a sensor that detects the surroundings of the vehicle. The camera 20 outputs the data of captured images to the control device 30. The sensor which performs detection ahead of the vehicle is not limited to the camera 20 and may also be radar, sonar, or other similar device. In addition or alternatively, for example, the subject vehicle may acquire information on other vehicles using vehicle-to-vehicle communication thereby to detect the state ahead of the subject vehicle.

The vehicle control apparatus 100 includes the motor 12, the steering angle sensor 13, the torque sensor 14, the camera 20, and the control device 30. These components of the vehicle control apparatus 100 are connected to one another via a controller area network (CAN) or other onboard LAN to mutually exchange information. The vehicle control apparatus 100 executes the steering control on the basis of the detection data which is input from the steering angle sensor 13 and the torque sensor 14. When a shift occurs between the steering amount of the steering wheel 2 and the actual steering angle detected by the steering angle sensor 13, the vehicle control apparatus 100 calculates a control steering amount such that the steering angle detected by the steering angle sensor 13 coincides with the steering amount of the steering wheel 2, and outputs a control command value corresponding to the control steering amount to the motor 12.

The control device 30 of the vehicle control apparatus 100 according to one or more embodiments of the present invention is a specific computer comprising a ROM 32 that stores a vehicle control program, a CPU 31 as an operation circuit that executes the program stored in the ROM 32 to serve as the vehicle control apparatus 100 according to one or more embodiments of the present invention, and a RAM 33 that serves as an accessible storage device.

The vehicle control program according to one or more embodiments of the present invention is a program for execution of a control procedure that includes detecting a state around the vehicle, executing steering control of the vehicle in accordance with the detection result, and generating a lateral movement of the vehicle. This program is executed by the control device 30 of the vehicle control apparatus 100 according to one or more embodiments of the present invention.

The control device 30 of the vehicle control apparatus 100 according to one or more embodiments of the present invention involves an ambient situation detection process, a calculation function of calculating a control command value for giving a steering amount, and a function of executing a steering control process. The control device 30 executes each of the above processes and functions by cooperation of software for realizing each process or function and the above-described hardware.

Here, a phenomenon will be described that the subject vehicle is attracted to another vehicle when passing the other vehicle. The other vehicle is, for example, a large-sized car, and the classification of large-sized cars can be preliminarily determined, for example, by the vehicle weight and the like. The large-sized car is a vehicle with which, for example, when the subject vehicle travels on the side of the large-sized car, a phenomenon occurs that the subject vehicle is attracted to the large-sized car. Large-sized cars are vehicles such as buses and trucks.

It is assumed that the subject vehicle and the other vehicle travel, for example, on a straight expressway. The traveling conditions of the subject vehicle and the other vehicle are as follows. The other vehicle is traveling in the left-side lane while the subject vehicle is traveling in the right-side lane (overtaking lane). The other vehicle travels ahead of the subject vehicle 40 and the vehicle speed (V1) of the subject vehicle 40 is higher than the vehicle speed (V2) of the other vehicle, so that the subject vehicle comes close to the other vehicle with time.

When the subject vehicle comes close to the other vehicle from behind, the other vehicle is traveling on the left ahead of the subject vehicle in a state of being close to the subject vehicle. At this time, a flow rate difference occurs between the air flowing to the left and right with respect to the subject vehicle. When, in the traveling direction of the subject vehicle, the airflow closer to the other vehicle is $A_L$ and the airflow farther from the other vehicle is $A_R$, the flow rate of the airflow ($A_L$) is lower than the flow rate of the airflow ($A_R$).

As such, when the subject vehicle comes close to the other vehicle and the subject vehicle travels to pass by the other vehicle, the subject vehicle is attracted to the other vehicle side (this phenomenon will also be referred to as an "attraction phenomenon," hereinafter). When the driver of the subject vehicle perceives the attraction phenomenon to the other vehicle, the driver operates the steering wheel 2 so as to get away from the other vehicle. At this time, the steering wheel 2 receives the steering force in the direction of coming close to the other vehicle; therefore, to generate the reaction force to the steering force, the steering torque has to be increased.

Provided that the attraction phenomenon is a disturbance, it is also conceivable to utilize a lane departure prevention assistance system to recover the travel trajectory of the subject vehicle to a target trajectory (linear trajectory). In the steering control used in the lane departure prevention assistance system, however, the steering control is executed when the subject vehicle receives a disturbance and the system detects that the subject vehicle is attracted to the other vehicle. Thus, it takes time until the control for suppressing the attraction phenomenon is executed after the system detects the attraction phenomenon. The vehicle control apparatus 100 according to one or more embodiments of the present invention executes the control for suppressing the attraction phenomenon in a short time by the vehicle control method, which will be described below.

Figure 2:
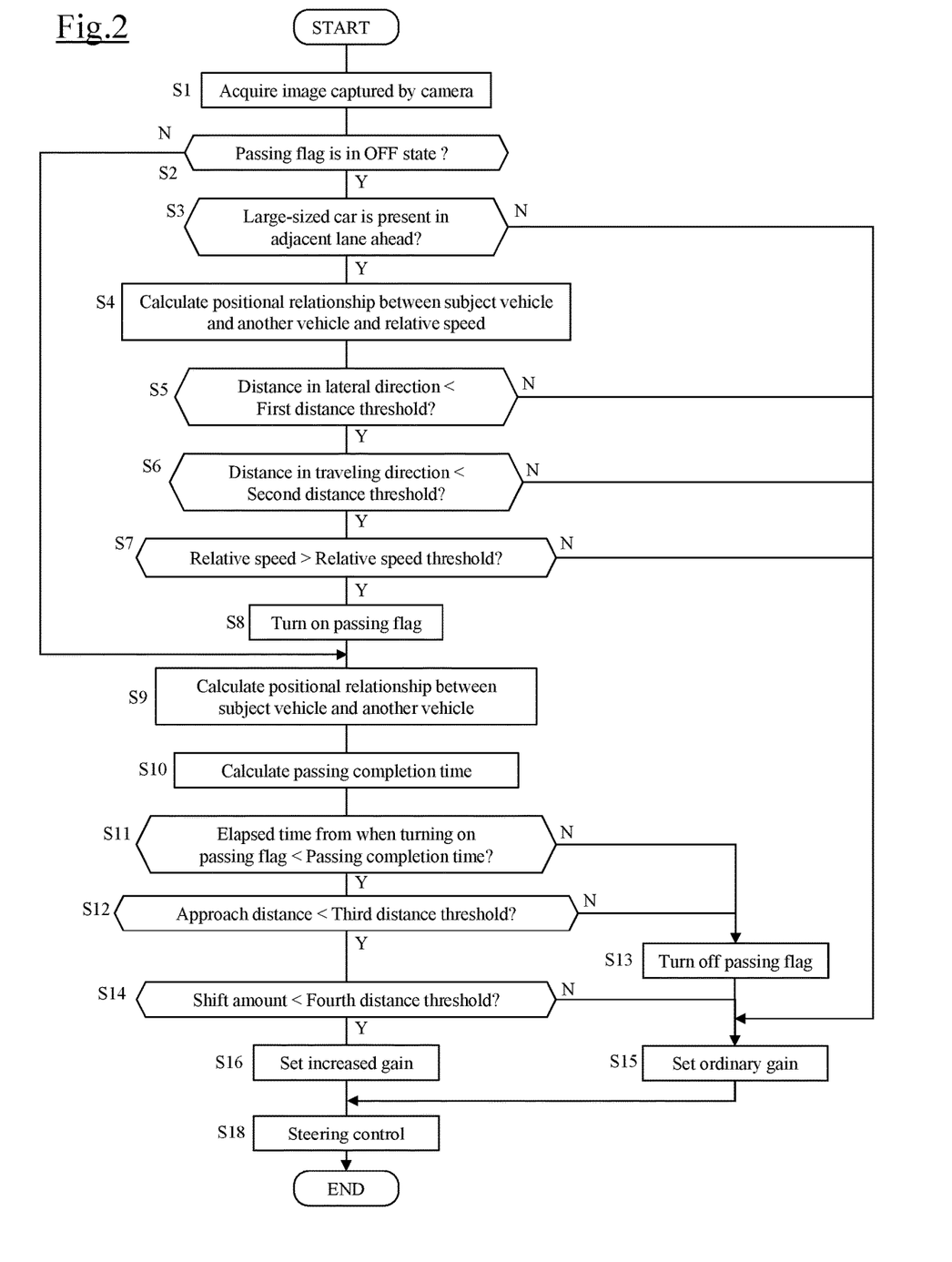
FIG. 2 is a flowchart illustrating a control procedure of a steering control process executed by the vehicle control system according to one or more embodiments of the present invention.

FIG. 2 is a flowchart illustrating a control procedure of the steering control process executed by the vehicle control system 1000 according to one or more embodiments of the present invention. The control flow illustrated in FIG. 2 is repeatedly executed at a predetermined cycle.

Figure 3:
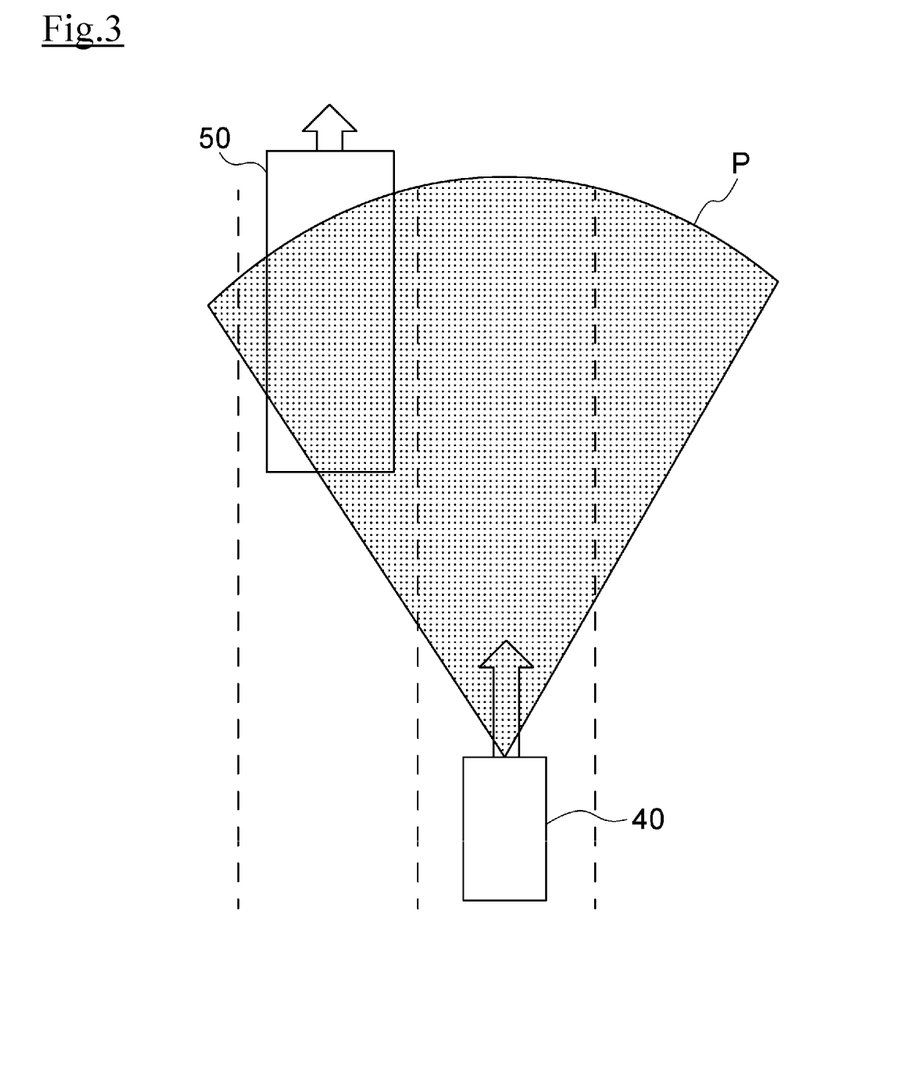
FIG. 3 is a diagram illustrating the positional relationship between the imaging range of a camera and another vehicle in the vehicle control system according to one or more embodiments of the present invention.

In step 1, the control device 30 acquires an image captured by the camera 20. FIG. 3 is a diagram illustrating the positional relationship between an imaging range P of the camera 20 and another vehicle 50. The camera 20 is installed at the front part of the subject vehicle 40. For example, the camera 20 is installed in the vicinity of the center above the windshield. As illustrated in FIG. 3, when the other vehicle 50 is traveling in an adjacent lane ahead of the subject vehicle 40, the other vehicle 50 is included in the imaging range of the camera 20.

In step 2, the control device 30 determines whether or not a passing flag is in the OFF state. The passing flag, which represents a value that indicates whether or not the subject vehicle 40 is about to pass a large-sized car, is stored in a memory (not illustrated) of the control device 30. When the subject vehicle 40 is about to pass a large-sized car, the passing flag is turned on. The passing flag is turned on when satisfying a passing condition that is preliminarily set. The determination as to whether the passing condition is satisfied is executed before the subject vehicle actually passes the other vehicle as an object to be passed.

When the passing flag is in the OFF state, the control flow of step 3 is executed. On the other hand, when the passing flag is in the ON state, the control flow of step 9 is executed.

The passing condition is defined by the size of another vehicle traveling ahead of the subject vehicle, the positional relationship between the subject vehicle and the other vehicle, and the relative speed of the subject vehicle to the other vehicle. The flow for determining whether or not the passing condition is satisfied corresponds to the control flow of step 3 to step 7.

In step 3, the control device 30 determines whether or not a large-sized car is present in an adjacent lane ahead. Specifically, the control device 30 acquires an image captured by the camera 20 and specifies a vehicle image from the captured image. The vehicle image is an image when viewed from behind the vehicle. The control device 30 measures the area of the vehicle image. The size of the vehicle image corresponds to the area of the vehicle image. The control device 30 compares the area of the vehicle image with an area threshold representing a large-sized car and, when the area of the vehicle image is larger than the area threshold, determines that the vehicle ahead is a large-sized car. When the control device 30 determines that a large-sized car is present in the adjacent lane ahead, the control flow of step 4 is executed. On the other hand, when the control device 30 determines that no large-sized car is present in the adjacent lane ahead, the control flow of step 15 is executed. Criteria for the control device 30 to determine whether or not a large-sized vehicle is present may include not only the size of the vehicle image but also the distance between the subject vehicle and another vehicle, the relative speed of the other vehicle to subject vehicle, etc.

In step 4, the control device 30 uses the image captured by the camera 20 to calculate the positional relationship between the subject vehicle and the other vehicle and the relative speed of the other vehicle to the subject vehicle. The camera 20 sequentially captures images ahead of the subject vehicle at a predetermined cycle. The control device 30 obtains a difference between the sequentially captured images and calculates a relative speed ($V_{ref}$) from the difference and the current vehicle speed of the subject vehicle.

Figure 4:
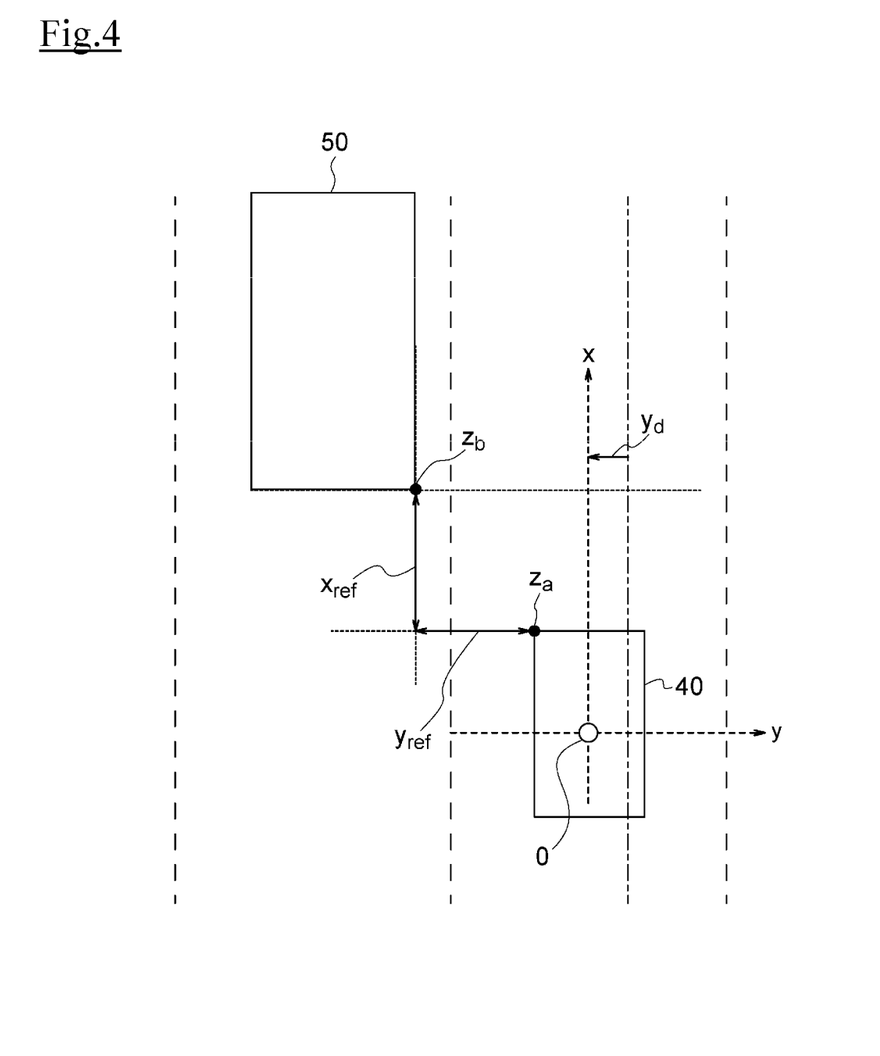
FIG. 4 is a diagram illustrating the positional relationship between the subject vehicle and another vehicle in the vehicle control system according to one or more embodiments of the present invention.

FIG. 4 is a diagram illustrating the positional relationship between the subject vehicle and another vehicle. As illustrated in FIG. 4, the other vehicle 50 is traveling in an adjacent lane ahead of the subject vehicle 40. The center point O of the subject vehicle 40 is the point of origin, the traveling direction of the subject vehicle 40 is the x-direction, and the lateral direction is the y-direction. The lateral direction of the subject vehicle is a direction orthogonal to the traveling direction of the subject vehicle 40 on the road surface. The control device 30 specifies a rear end $Z_b$ of the other vehicle 50 from the image captured by the camera 20. The rear end $Z_b$ is a vertex closest to the subject vehicle 40 among vertices on the four corners when the other vehicle 50 is viewed from directly above. As illustrated in FIG. 4, when the other vehicle 50 is traveling on the left side ahead of the subject vehicle 40, the rear end $Z_b$ is a point positioned at the lower right when the other vehicle 50 is viewed from directly above. The control device 30 also specifies a front end $Z_a$ of the subject vehicle. The front end $Z_a$ is a vertex closest to the other vehicle 50 among vertices on the four corners when the subject vehicle 40 is viewed from directly above. The positions of the front end $Z_a$ and the rear end $Z_b$ can be represented by position coordinates with the center point O as the point of origin.

The control device 30 calculates an inter-vehicle distance in the x-direction and an inter-vehicle distance in the y-direction. The inter-vehicle distance $x_{ref}$ in the x-direction represents a length (longitudinal length) of the x-component of the distance from the front end $Z_a$ of the subject vehicle to the rear end $Z_b$ of the other vehicle, and the inter-vehicle distance $y_{ref}$ in the y-direction represents a length of the y-component (lateral length) of the distance from the front end $Z_a$ of the subject vehicle to the rear end $Z_b$ of the other vehicle.

The control device 30 also calculates a shift amount (amount of deviation) ($y_d$) in the y-direction. The shift amount represents the magnitude of a shift with respect to the center line C of the travel lane of the subject vehicle 40. The center line (lane center line) C is a line located on the center of a boundary line (white line) that divides the travel lane. The shift amount ($y_d$) is a distance between the center line C and the x-axis. The larger the shift amount ($y_d$), the shorter the lateral approach distance between the subject vehicle 40 and the other vehicle 50. When the other vehicle is present on the left side of the subject vehicle, the shift amount ($y_d$) takes a positive value in the direction leftward from the center line C. When the other vehicle is present on the right side of the subject vehicle, the shift amount ($y_d$) takes a positive value in the direction rightward from the center line C. The shift amount ($y_d$) being larger than zero means that the subject vehicle is closer to the other vehicle than the center line C.

In step 5, the control device 30 compares the lateral inter-vehicle distance ($y_{ref}$) with a first distance threshold ($y_{th\_a}$) to determine whether or not the lateral inter-vehicle distance ($y_{ref}$) is less than the first distance threshold ($y_{th\_a}$). The first distance threshold ($y_{th\_a}$) is a threshold for determining that the lateral spacing between the subject vehicle and the other vehicle is small. The first distance threshold ($y_{th\_a}$), which represents a length in the y-direction, is a threshold that is preliminarily set. When the lateral inter-vehicle distance ($y_{ref}$) is less than the first distance threshold ($y_{th\_a}$), the control device 30 executes the control flow of step 6. When the lateral inter-vehicle distance ($y_{ref}$) is not less than the first distance threshold ($y_{th\_a}$), the control device 30 determines that there is no other vehicle with a short inter-vehicle distance in the lateral direction of the subject vehicle, and executes the control flow of step 15.

In step 6, the control device 30 compares the inter-vehicle distance ($x_{ref}$) in the traveling direction with a second distance threshold ($x_{th\_a}$) to determine whether or not the inter-vehicle distance ($x_{ref}$) in the traveling direction is less than the second distance threshold ($x_{th\_a}$). The second distance threshold ($x_{th\_a}$) is a threshold for determining that the spacing in the traveling direction between the subject vehicle and the other vehicle is small. The second distance threshold ($x_{th\_a}$), which represents a length in the x-direction, is a threshold that is preliminarily set. When the inter-vehicle distance ($x_{ref}$) in the traveling direction is less than the second distance threshold ($x_{th\_a}$), the control device 30 executes the control flow of step 7. When the inter-vehicle distance ($x_{ref}$) in the traveling direction is not less than the second distance threshold ($x_{th\_a}$), the control device 30 determines that no other vehicle with a short inter-vehicle distance in the traveling direction of the subject vehicle is present in an adjacent lane, and executes the control flow of step 15.

In step 7, the control device 30 compares the relative speed ($V_{ref}$) with a relative speed threshold ($V_{th}$) to determine whether or not the relative speed ($V_{ref}$) is higher than the relative speed threshold ($V_{th}$). The relative speed threshold ($V_{th}$) is a determination threshold that indicates that the subject vehicle continues to come close to the other vehicle with time. The relative speed threshold ($V_{th}$) is a threshold that is preliminarily set. When the relative speed ($V_{ref}$) is higher than the relative speed threshold ($V_{th}$), the control device 30 executes the control flow of step 8.

That is, when there is another vehicle with short inter-vehicle distances in the x-direction and y-direction of the subject vehicle and the subject vehicle is coming close to the other vehicle from behind with time, the control device 30 determines that the passing condition is satisfied. On the other hand, when the relative speed ($V_{ref}$) is not higher than the relative speed threshold ($V_{th}$), the control device 30 determines that the subject vehicle is not coming close to the other vehicle with time, and executes the control flow of step 10.

In step 8, the control device 30 switches the passing flag from OFF to ON. In step 9, the control device 30 uses the image captured by the camera 20 to calculate the positional relationship between the subject vehicle and the other vehicle and the relative speed ($V_{ref}$) of the other vehicle to the subject vehicle. The positional relationship between the subject vehicle and the other vehicle is represented by the inter-vehicle distance ($x_{ref}$) in the traveling direction and the inter-vehicle distance ($y_{ref}$) in the lateral direction. When the control flow of step 9 is executed immediately after the passing flag is turned on, the positional relationship ($x_{ref}$, $y_{ref}$) between the subject vehicle and the other vehicle, the shift amount ($y_d$), and the relative speed ($V_{ref}$), which are calculated in the control flow of step 4, may be used.

In step 10, the control device 30 calculates a passing completion time ($t_{end}$) using the positional relationship ($x_{ref}$) and the relative speed ($V_{ref}$). The passing completion time ($t_{end}$) can be obtained, for example, through adding the inter-vehicle distance ($x_{ref}$) in the traveling direction to the length of the other vehicle in the x-direction and dividing the obtained value by the relative speed ($V_{ref}$).

In step 11, the control device 30 compares an elapsed time ($t_d$) from the time when the passing flag is turned on with the passing completion time ($t_{end}$). When the elapsed time ($t_d$) is less than the passing completion time ($t_{end}$), the control device 30 determines that passing has not been completed, and executes the control flow of step 12. On the other hand, when the elapsed time ($t_d$) is not less than the passing completion time ($t_{end}$), the control device 30 determines that passing has been completed, and executes the control flow of step 13. In the control flow of step 13, the control device 30 switches the passing flag to the OFF state.

In step 12, the control device 30 calculates an approach distance ($L_{ref}$) between the subject vehicle and the other vehicle and compares the approach distance ($L_{ref}$) with a third distance threshold ($L_{th}$). The approach distance ($L_{ref}$) corresponds to a distance from the front end $Z_a$ of the subject vehicle to the rear end $Z_b$ of the other vehicle. The approach distance ($L_{ref}$) is a threshold for determining that the subject vehicle is coming close to the other vehicle from behind. When the approach distance ($L_{ref}$) is less than the third distance threshold ($L_{th}$), the control device 30 executes the control flow of step 14. When the approach distance ($L_{ref}$) is not less than the third distance threshold ($L_{th}$), the control device 30 executes the control flow of step 13. In step 13, the control device 30 turns off the passing flag. Then, the control device 30 executes the control flow of step 15.

In step 14, the control device 30 compares the shift amount ($y_d$) with a fourth distance threshold ($y_{d\_th}$). The fourth distance threshold ($y_{d\_th}$) is a threshold for determining whether or not the subject vehicle is closer to the other vehicle side than the center line C of the travel lane. The fourth distance threshold ($y_{d\_th}$) is a value of zero or more. When the shift amount ($y_d$) is larger than the fourth distance threshold ($y_{d\_th}$), the control device 30 executes the control flow of step 16. On the other hand, when the shift amount ($y_d$) is not larger than the fourth distance threshold ($y_{d\_th}$), the control device 30 executes the control flow of step 15.

In step 15, the control device 30 sets an integral increase gain ($k_i$) to an ordinary gain. The ordinary gain is one. In step 16, the control device 30 sets the integral increase gain ($k_i$) to an increased gain. The increased gain has a value larger than one. In step 17, the control device 30 executes the operation control using the integral term increase gain which is set in step 15 or step 16.

Figure 5:
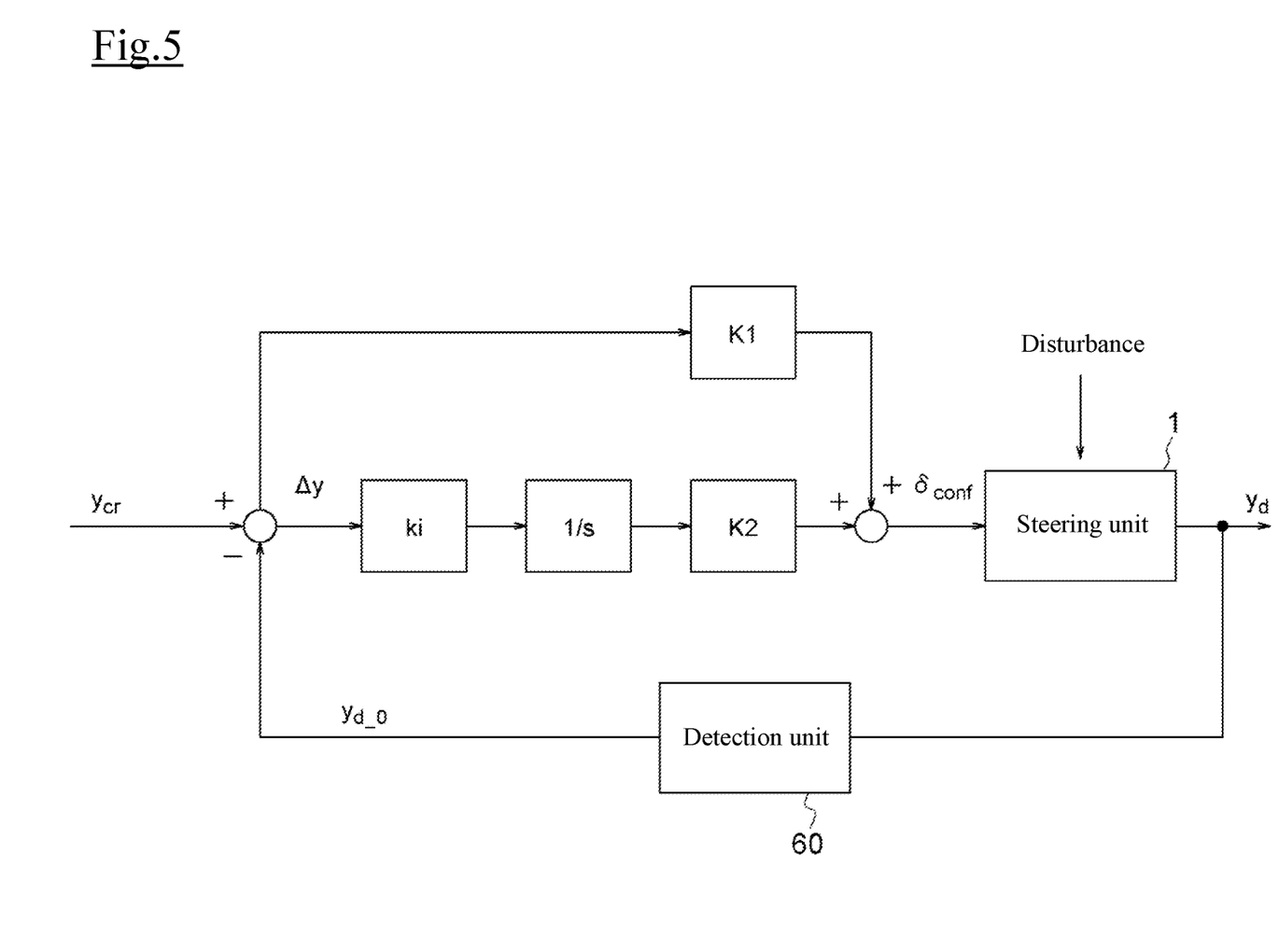
FIG. 5 is a block diagram of steering control executed by a control device in the vehicle control system according to one or more embodiments of the present invention.
Figure 6:
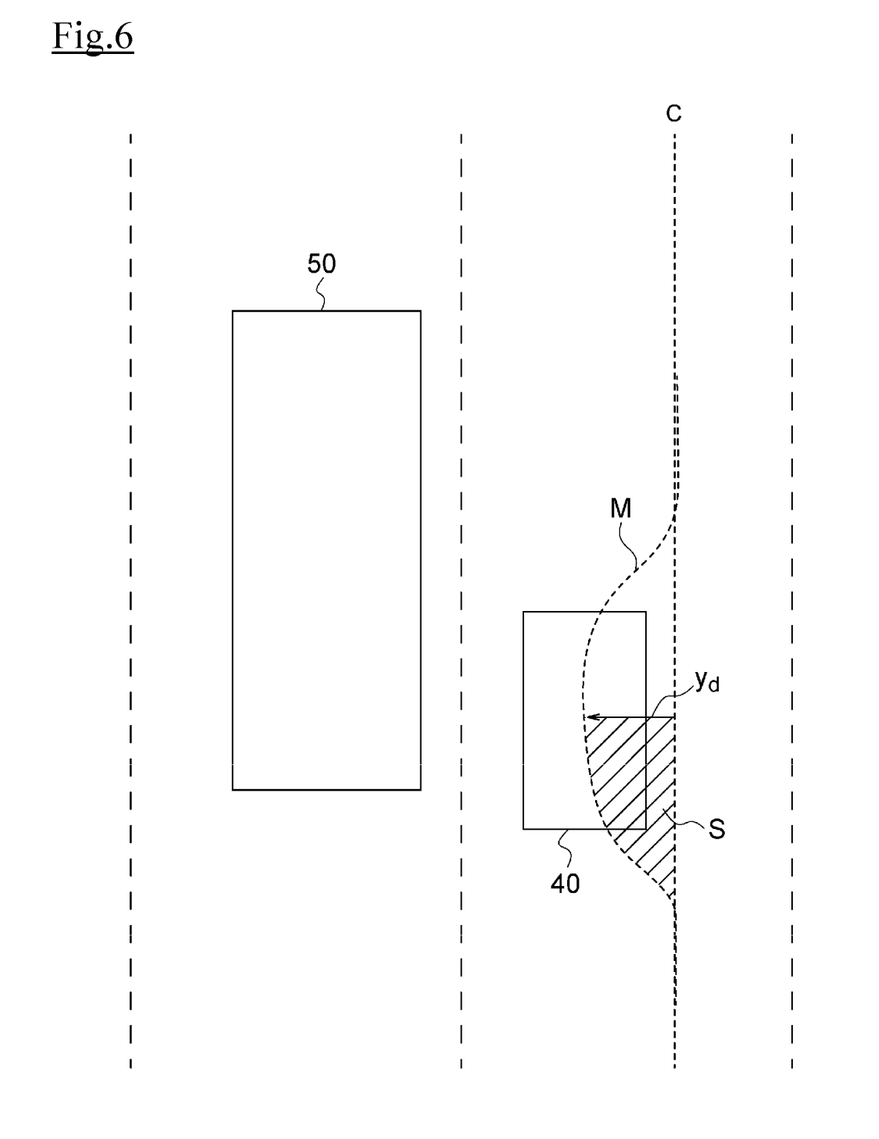
FIG. 6 is a diagram illustrating the positional relationship between the subject vehicle and another vehicle in the vehicle control system according to one or more embodiments of the present invention.

Details of the control flow from step 15 to step 17 will be described with reference to FIG. 5. FIG. 5 is a block diagram of the steering control. FIG. 6 is a diagram illustrating the positional relationship between the subject vehicle and another vehicle.

The control device 30 has an input of a command value ($y_{cr}$) of the shift amount and an output of a steering control amount ($\delta_{conf}$). The steering control amount ($\delta_{conf}$) is represented by a steering torque command value required to generate the steering amount. The steering torque command value is input to the steering unit 1, which outputs the steering amount (steering torque) corresponding to the command value. K1 represents a transfer element when the command value ($y_{cr}$) of the shift amount is the input and the steering amount is the output. K2 represents a transfer element when a difference ($\Delta y$) is the input and the steering amount is the output. The difference ($\Delta y$) is a difference ($\Delta y_d$) between the command value ($y_{cr}$) of the shift amount and a shift amount ($y_{d\_0}$) that is detected by the sensor. $k_i$ represents the integral increase gain.

The command value ($y_{cr}$) of the shift amount is a target value for moving the subject vehicle 40 in the lateral direction in order that the travel trajectory of the subject vehicle 40 coincides with the target trajectory of the subject vehicle 40 when the position of the subject vehicle 40 is shifted with respect to the center line C of the travel lane. The travel trajectory of the subject vehicle represents a trajectory on the route along which the subject vehicle actually travels. The target trajectory is a trajectory of travel that is to be a target when the subject vehicle travels by automated or autonomous driving or the like. The target trajectory can be obtained, for example, using an image captured by the camera 12 or the like. The control device 30 calculates the steering control amount ($\delta_{conf}$) for the command value ($y_{cr}$) of the shift amount using a transfer function illustrated as the block diagram of FIG. 5. The steering unit 1 outputs the steering torque for the input of the steering control amount ($\delta_{conf}$). In practice, the output of the steering unit 1 is the steering torque for the front wheels 3 and 4, but for descriptive purposes, FIG. 5 illustrates the output as the shift amount ($y_d$) of the subject vehicle 40 in the lateral direction. This shift amount ($y_d$) represents a shift amount of the subject vehicle 40 after the front wheels 3 and 4 are steered in accordance with the steering control amount ($\delta_{conf}$). If there is a disturbance, the shift amount corresponding to the output of the steering unit 1 will deviate significantly from the command value ($y_{cr}$).

The transfer function, which is a control function for giving the steering amount for the shift amount ($y_d$), includes a proportional term proportional to the command value ($y_{cr}$) and a feedback (FB) term in response to the difference ($\Delta y$) of the shift amount. The proportional coefficient of the proportional term is K1. The FB term is to feed back the detection value detected by a detection unit 60, take the difference between the detection value and the command value of the shift amount, and calculate the value of integral for the difference.

The transfer function is represented by the following Expression (1).

[Expression 1]

$$\delta_{conf} = K1 \cdot y_{cr} + K2 \cdot \int k_i \cdot \Delta y \, dl \qquad (1)$$

Provided that the steering amount when the subject vehicle 40 is attracted to the other vehicle 50 is $\delta_p$, the steering amount on the opposite side to the direction of being attracted is larger than the steering amount ($\delta_p$), when the following Expression (2) is satisfied. When the subject vehicle is being attracted to a large-sized car, the tire lateral force necessary to cancel the force of being attracted to the large-sized car is generated, and the travel trajectory of the subject vehicle is recovered to the target trajectory.

[Expression 2]

$$\delta_p < \int \delta_{conf} \qquad (2)$$

As described in Expression (1), the transfer function includes the integral term; therefore, the steering amount for the lateral shift (deviation) of the subject vehicle increases with time. Moreover, the integral term includes the integral increase gain ($k_i$); therefore, the steering amount increases as the integral increase gain ($k_i$) increases. Furthermore, the integral term is represented by the integral expression of the difference ($\Delta y$) of the shift amount; therefore, the steering amount (steering control amount) increases as the lateral shift amount between the travel trajectory of the subject vehicle and the target trajectory increases.

As illustrated in FIG. 6, when the attraction phenomenon occurs, the travel trajectory M of the subject vehicle expands toward the other vehicle side with respect to the target trajectory C. The target trajectory C is taken as the center line of the travel lane. An area (S) of the area surrounded by the travel trajectory M and the target trajectory C is an integrated value per unit time of the shift amount ($y_d$). In one or more embodiments of the present invention, the integral term includes the integral increase gain ($k_i > 1$); therefore, the amount of expansion of the travel trajectory M toward the other vehicle side is small and the area (S) is also small.

In one or more embodiments of the present invention, the steering control by the lane departure prevention system is performed as the control in ordinary times. In the lane departure prevention system, the integral increase gain ($k_i$) is set to the ordinary gain. The control device 30 detects the state ahead of the vehicle using the camera 12 and determines whether or not the passing condition is satisfied. When a large-sized car is traveling in an adjacent lane ahead of the subject vehicle and the passing condition is satisfied, the control device 30 sets the integral increase gain ($k_i$) to the increased gain before the subject vehicle actually overtakes the other vehicle. After the integral increase gain ($k_i$) is set to the increased gain, when the subject vehicle comes close to the other vehicle and the position of the subject vehicle is on the side of the other vehicle, the attraction phenomenon is likely to occur.

When the attraction phenomenon occurs, the subject vehicle deviates in the lateral direction so as to be attracted to the other vehicle. To avoid being attracted to the other vehicle, the steering wheel 2 is operated in the opposite direction to the direction of being attracted. The operation of the steering wheel 2 may be operation by automated or autonomous driving or may also be operation by the driver. In this operation according to one or more embodiments of the present invention, the integral increase gain ($k_i$) in the lane departure prevention system is set to the increased gain and, therefore, the response of the steering amount to the operation input of the steering wheel 2 is higher than the response in ordinary times. In other words, the steering amount (steering torque) for giving the steering amount for the operation amount of the steering wheel is larger than the steering amount (steering torque) which is output in ordinary times. Thus, in one or more embodiments of the present invention, it is possible to predict in advance that the subject vehicle will be attracted to the other vehicle. The system can therefore execute the steering control for giving the steering amount (also referred to as "attraction suppression control," hereinafter) in a short time after the attraction phenomenon occurs. Moreover, when the subject vehicle passes a large-sized car, the followability to the target trajectory can be enhanced.

In one or more embodiments of the present invention, the driving assistance system including the lane departure prevention system (lane keeping system) may have an automated or autonomous driving function. The automated or autonomous driving includes controlling the steering angle, the vehicle speed, etc. so that the subject vehicle travels along the target trajectory. In the driving assistance system, when the travel trajectory of the subject vehicle shifts from the target trajectory, such as due to a disturbance, and the subject vehicle deviates in the lateral direction, the steering amount is given in accordance with the lateral shift amount to execute the steering control in an automated or autonomous manner. In one or more embodiments of the present invention, when the subject vehicle departs from the travel lane in a state in which the overtaking condition is not satisfied, the steering control is executed in an automated or autonomous manner with the response in the ordinary control. On the other hand, when the attraction phenomenon occurs in a state in which the overtaking condition is satisfied, the steering control is executed in an automated or autonomous manner with a higher response than the response in the ordinary control.

The driving assistance system including the lane departure prevention system (lane keeping system) may not necessarily have an automated or autonomous driving function. For example, a system may be employed in which, when the subject vehicle behaves so as to depart from the detected lane, the driver is notified of the lane departure by a warning display or a warning sound, and when the driver performs the steering operation so as to recover to the lane, the steering operation by the driver is assisted.

Figure 7:
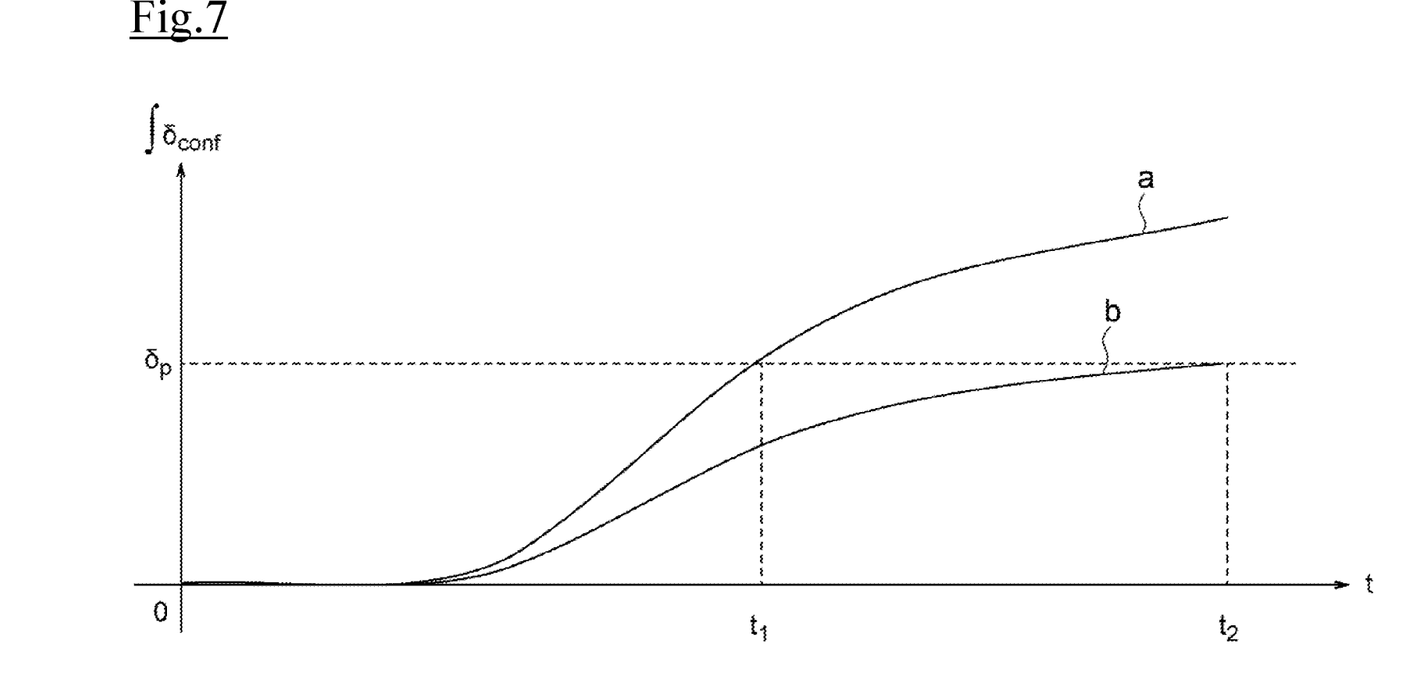
FIG. 7 is a graph illustrating the steering amount characteristics in the vehicle control system according to one or more embodiments of the present invention.

FIG. 7 is a graph illustrating the steering amount characteristics. Graphs 'a' and 'b' represent the characteristics when the attraction phenomenon occurs and the control is executed to avoid being attracted to a large-sized car. The graph 'a' represents the characteristic when the integral increase gain ($k_i$) is set to the increased gain while the graph 'b' represents the characteristic when the integral increase gain ($k_i$) is set to the ordinary gain unlike one or more embodiments of the present invention. The horizontal axis represents time (t). The vertical axis represents the steering torque. $\delta_p$ is a steering amount when the subject vehicle 40 is attracted to the other vehicle 50.

As illustrated in the graph 'a,' when the integral increase gain ($k_i$) is set to the increased gain, the steering amount (corresponding to the integrated value of the steering control amount ($\delta_{conf}$)) for giving the steering amount becomes larger than the steering amount ($\delta_p$) at the time ($t_1$). On the other hand, when the integral increase gain ($k_i$) is set to the ordinary gain, the steering amount (corresponding to the integrated value of the steering control amount ($\delta_{conf}$)) for giving the steering amount becomes larger than the steering amount ($\delta_p$) at the time ($t_2 > t_1$). That is, in one or more embodiments of the present invention, because the integral increase gain ($k_i$) is increased to make the response of the steering amount to the input to the steering unit 1 higher than the response in ordinary times, the time until the value of integral included in the transfer function of Expression (1) increases is shortened. As a result, in one or more embodiments of the present invention, the attraction amount to a large-sized car can be reduced.

The vehicle control apparatus 100 according to one or more embodiments of the present invention may be applied to a driving assistance system such as a lane departure prevention system (lane keeping system). The lane departure prevention system detects a lane using a camera or the like. When the subject vehicle behaves so as to depart from the detected lane, the system executes the steering control such that the subject vehicle keeps the current travel lane. Specifically, the vehicle control apparatus 100 calculates the steering control amount for giving the steering amount in accordance with the difference (shift amount) between the current travel trajectory of the subject vehicle and the target trajectory and outputs the command value to the motor 12. The vehicle control apparatus 100 executes the control of recovering the travel trajectory of the subject vehicle to the target trajectory by operating the motor 12 in accordance with the steering control amount to give the steering amount in the lateral direction with respect to the travel lane of the subject vehicle. The integral increase gain ($k_i$) in this operation is the ordinary gain (corresponding to the ordinary control).

The vehicle control apparatus 100 detects the state ahead of the subject vehicle using an image captured by the camera 20 and determines whether or not the passing condition is satisfied. When the passing condition is not satisfied, the vehicle control apparatus 100 sets the integral increase gain ($k_i$) in the steering control to the ordinary gain. On the other hand, when the passing condition is satisfied, the vehicle control apparatus 100 sets the integral increase gain ($k_i$) to the increased gain. The vehicle control apparatus 100 calculates the steering control amount so that, for the shift amount between the current travel trajectory of the subject vehicle and the target trajectory, the magnitude of the steering amount is larger than that in the ordinary control. That is, the vehicle control apparatus 100 makes the response of the magnitude of the steering amount to the shift amount higher than the response in the ordinary control. Through this operation, when the attraction phenomenon causes the subject vehicle to behave so as to depart from the travel lane, the steering control can be performed in a short time so that the vehicle keeps the current travel lane.

As described above, the vehicle control apparatus 100 according to one or more embodiments of the present invention executes the control of recovering the travel trajectory of the subject vehicle to the target trajectory, as the ordinary control, by giving the steering amount in the lateral direction with respect to the travel lane of the subject vehicle and uses the detection data of the camera 20 to determine whether or not a large-sized car is traveling in an adjacent lane. When a determination is made that the large-sized car is traveling in the adjacent lane ahead of the subject vehicle, the response of the steering amount is increased to a higher response than that in the ordinary control, before the subject vehicle passes the large-sized car. This allows the attraction suppression control to be executed in a short time.

In one or more embodiments of the present invention, when the large-sized car travels in the adjacent lane ahead of the subject vehicle and the subject vehicle travels on a side closer to the large-sized car with respect to the target trajectory of the subject vehicle, the response of the steering torque is set to a first response, while when the large-sized car travels in the adjacent lane ahead of the subject vehicle and the subject vehicle travels on a side far from the other vehicle with respect to the target trajectory, the response of the steering torque is set to a second response. The first response is higher than the second response. The first response corresponds to the response when the integral increase gain ($k_i$) is set to the increased gain, and the second response corresponds to the response when the integral increase gain ($k_i$) is set to the ordinary gain.

In one or more embodiments of the present invention, the control flow of step 14 includes comparing the shift amount ($y_d$) with the fourth distance threshold ($y_{d\_th}$) to determine whether or not the subject vehicle is closer to the other vehicle side than the center line C of the travel lane of the subject vehicle (the center line C corresponds to the target trajectory of the subject vehicle). When the shift amount ($y_d$) is larger than the fourth distance threshold ($y_{d\_th}$), the subject vehicle is traveling on the other vehicle side of the center line C; therefore, the integral increase gain ($k_i$) is set to the increased gain and the torque for the steering torque is set to the high response. On the other hand, when the shift amount ($y_d$) is smaller than the fourth distance threshold ($y_{d\_th}$), the subject vehicle is traveling on the opposite side of the center line C to the other vehicle; therefore, the integral increase gain ($k_i$) is set to the ordinary gain and the torque for the steering torque is set to the low response. Through this operation, when the subject vehicle is traveling on the opposite side to a large-sized car on the side, the response of the steering torque is the ordinary response, so that the uncomfortable feeling can be alleviated when the driver steers to the opposite side to the large-sized car.

In one or more embodiments of the present invention, the lateral shift amount ($y_d$) between the travel trajectory of the subject vehicle and the target trajectory is calculated, and the response of the steering amount is increased to a higher response than that in ordinary times in accordance with the shift amount ($y_d$). This can enhance the followability to the target trajectory when the subject vehicle passes a large-sized car. Moreover, the steering control amount can be quickly changed for the attraction amount to the large-sized.

In one or more embodiments of the present invention, when the subject vehicle has passed the large-sized car, the response of the steering amount is recovered to the ordinary response of the steering amount. Through this operation, the response can be recovered at the time point when the influence by the attraction disappears.

In one or more embodiments of the present invention, when the passing condition is satisfied, the integral increase gain ($k_i$) is set to the increased gain, while when the passing condition is not satisfied, the integral increase gain ($k_i$) is set to the ordinary gain. This can suppress the occurrence of frequent correction of steering to the target trajectory when traveling by the ordinary driving assistance.

In one or more embodiments of the present invention, the value of the integral increase gain ($k_i$) may be set in accordance with the shift amount. For example, the control device 30 increases the integral increase gain ($k_i$) as the shift amount ($y_d$) increases. This can enhance the followability to the target trajectory when the subject vehicle passes a large-sized car.

In one or more embodiments of the present invention, the determination as to whether or not the subject vehicle 40 has passed the other vehicle 50 may be made not only using the elapsed time ($t_d$) from when the passing flag is turned on, but also using the inter-vehicle distance.

Figure 8:
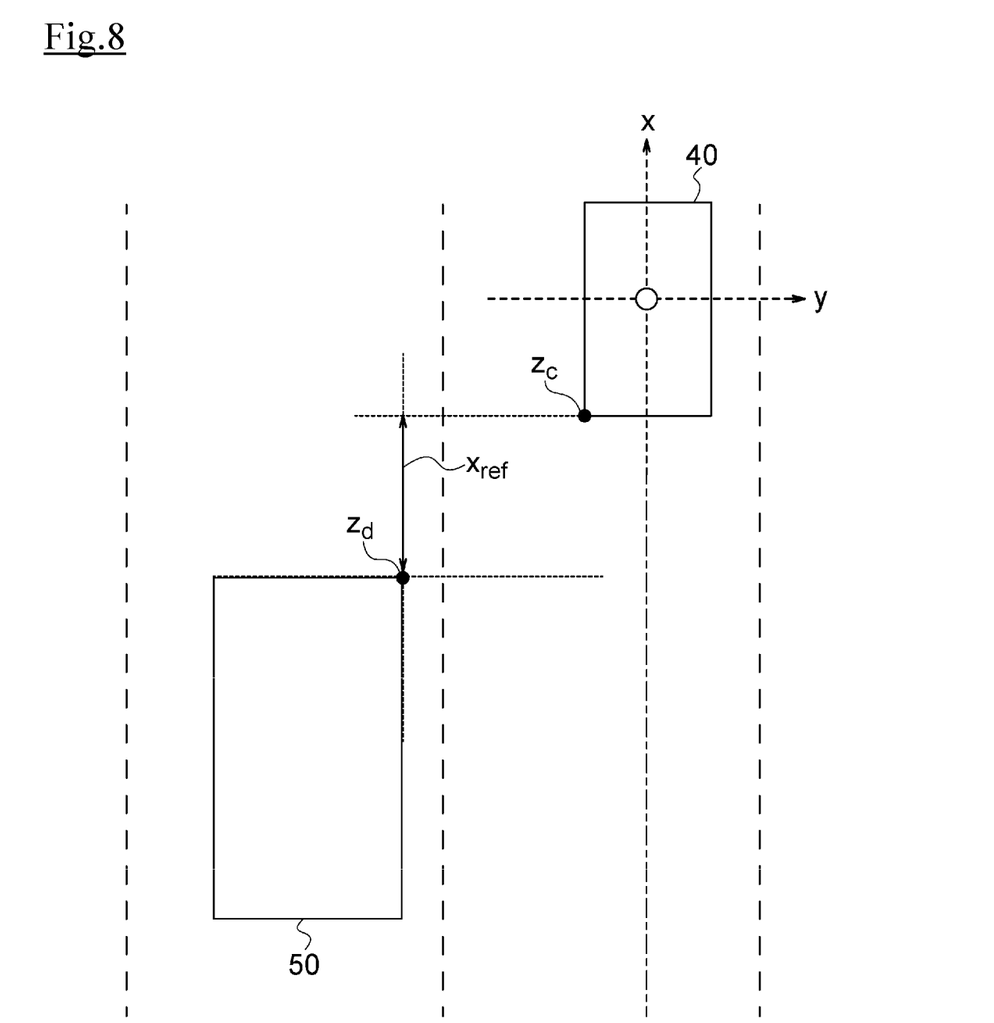
FIG. 8 is a diagram illustrating the positional relationship between the subject vehicle and another vehicle in the vehicle control system according to one or more embodiments of the present invention.

The control in which the integral increase gain ($k_i$) is set to the increased gain and then recovered to the ordinary gain will be described with reference to FIG. 8. FIG. 8 is a diagram illustrating the positional relationship between the subject vehicle and another vehicle. As illustrated in FIG. 8, the subject vehicle 40 has passed the other vehicle 50, and the other vehicle is traveling in the adjacent lane behind the subject vehicle 40. The denotation of the x-axis, the y-axis, and the center point O is the same as in FIG. 4.

The control device 30 specifies a front end $Z_d$ of the other vehicle 50 from an image captured by the camera 20. The front end $Z_d$ is a vertex closest to the subject vehicle 40 among vertices on the four corners when the other vehicle 50 is viewed from directly above. As illustrated in FIG. 8, when the other vehicle 50 is traveling on the left side behind the subject vehicle 40, the front end $Z_d$ is a point positioned at the upper right when the other vehicle 50 is viewed from directly above. The control device 30 also specifies a rear end $Z_c$ of the subject vehicle. The rear end $Z_c$ is a vertex closest to the other vehicle 50 among vertices on the four corners when the subject vehicle 40 is viewed from directly above.

The control device 30 calculates an inter-vehicle distance ($x_{ref}$) in the x-direction and an inter-vehicle distance ($y_{ref}$) in the y-direction. The control device 30 compares the inter-vehicle distance ($x_{ref}$) in the traveling direction with a fifth distance threshold ($x_{th\_b}$) to determine whether or not the inter-vehicle distance ($x_{ref}$) is larger than the fifth distance threshold ($x_{th\_b}$). When the inter-vehicle distance ($x_{ref}$) is larger than the fifth distance threshold ($x_{th\_b}$), the control device 30 determines that the subject vehicle 40 has passed the other vehicle 50, and recovers the integral increase gain ($k_i$) from the increased gain to the ordinary gain thereby to recover the response of the steering amount to the response in ordinary times. On the other hand, when the inter-vehicle distance ($x_{ref}$) is not larger than the fifth distance threshold ($x_{th\_b}$), the control device 30 determines that the subject vehicle 40 has not passed the other vehicle 50, and keeps the integral increase gain ($k_i$) at the increased gain.

One or more embodiments of the present invention are not limited to giving the steering amount for the control of the motor 12 in which the opposite torque is output to the steering torque caused by a disturbance. In addition or alternatively, the motor 12 may be controlled so that the steering torque caused by a disturbance and the torque by the given steering amount are canceled each other, that is, so that the torque by the given steering amount is added to the steering torque caused by a disturbance thereby to reduce the steering torque caused by the disturbance.

In one or more embodiments of the present invention, the determination as to whether or not the subject vehicle 40 has passed the other vehicle 50 may be made using a rear camera, side radar, sonar, or the like installed at the rear part of the subject vehicle.

In one or more embodiments of the present invention, the input of the response of the steering amount may be made not only by the driver's steering operation but also by a control command in an automated or autonomous driving system. That is, when the vehicle is traveling by the automated or autonomous driving and the subject vehicle passes a large-sized car on an adjacent lane, the response of the steering amount may be set by the vehicle control system according to one or more embodiments of the present invention. Through this operation, it is not necessary to detect the torque input by the driver to the steering wheel 2 and, therefore, the attraction suppression control can be executed in a short time even when the torque input by the driver to the steering wheel 2 is extremely small or even in an automated or autonomous driving vehicle in which there is no torque input by the driver to the steering wheel 2.

DESCRIPTION OF REFERENCE NUMERALS

1 Steering unit
2 Steering wheel
3, 4 Wheel
11 Shaft
12 Motor
13 Steering angle sensor
14 Torque sensor
20 Camera
30 Control device
40 Subject vehicle
50 Another vehicle
60 Detection unit
100 Vehicle control apparatus
1000 Vehicle control system

What is claimed is:
1. A vehicle control method for controlling a vehicle using a vehicle control apparatus that includes a sensor for detecting a state ahead of a subject vehicle and a control device, the vehicle control method comprising:
controlling a steering angle so that the subject vehicle travels along a target trajectory;
when a travel trajectory of the subject vehicle shifts from the target trajectory, executing control of recovering the travel trajectory of the subject vehicle to the target trajectory, as ordinary control, by giving a steering amount in accordance with a lateral shift amount between the travel trajectory and the target trajectory to execute steering control in an autonomous manner;

detecting, using the sensor, another vehicle that is traveling in an adjacent lane to a travel lane of the subject vehicle and located ahead of the subject vehicle; and when detecting the other vehicle, increasing a response of the steering amount in accordance with the lateral shift amount between the travel trajectory and the target trajectory in a lateral direction to a higher response than that in the ordinary control, before the subject vehicle passes the detected other vehicle to execute the steering control in the autonomous manner.

2. The vehicle control method according to claim 1, comprising:

in response to detecting the other vehicle traveling in the adjacent lane ahead of the subject vehicle and the subject vehicle is traveling on a side closer to the detected other vehicle with respect to the target trajectory; setting the response of a steering torque to a first response; and in response to detecting the other vehicle traveling in the adjacent lane ahead of the subject vehicle and the subject vehicle travels on a side far from the detected other vehicle with respect to the target trajectory, setting the response of the steering torque to a second response, the first response being higher than the second response.

3. The vehicle control method according to claim 1, further comprising:

when the subject vehicle has passed the detected other vehicle, recovering the response of the steering amount to the response of the steering amount in the ordinary control.

4. A vehicle control apparatus comprising:

a sensor that detects a state ahead of a subject vehicle;

an actuator that gives a steering amount in a lateral direction with respect to a travel lane of the subject vehicle; and a controller that controls the actuator, the controller configured to:

control a steering angle so that the subject vehicle travels along a target trajectory;

when the travel trajectory of the subject vehicle shifts from the target trajectory, execute control of recovering the travel trajectory of the subject vehicle to the target trajectory, as ordinary control, by operating the actuator and giving a steering amount in accordance with a lateral shift amount between the travel trajectory and the target trajectory to execute steering control in an autonomous manner;

detect, using the sensor, another vehicle traveling in an adjacent lane to the travel lane of the subject vehicle and located ahead of the subject vehicle; and when detecting the other vehicle, increase a response of the steering amount in accordance with the lateral shift amount between the travel trajectory and the target trajectory in a lateral direction to a higher response than that in the ordinary control, before the subject vehicle passes the detected other vehicle to execute the steering control in the autonomous manner.

5. The vehicle control method according to claim 1, further comprising:

when not detecting the other vehicle, executing the control of recovering the travel trajectory with the ordinary control.

* * * * *